United States Patent [19]
Abate

[11] 3,772,547
[45] Nov. 13, 1973

[54] ROTATION SENSING ASSEMBLY
[75] Inventor: Galileo Abate, Turin, Italy
[73] Assignee: Fiat Societa per Azioni, Turin, Italy
[22] Filed: Sept. 14, 1971
[21] Appl. No.: 180,272

[30] Foreign Application Priority Data
Nov. 3, 1970 Italy .............................. 70663 A/70

[52] U.S. Cl. ............................................... 310/168
[51] Int. Cl. ........................................... H02k 19/24
[58] Field of Search .................... 310/168, 169, 170, 310/83, 75; 74/713; 184/11 A

[56] References Cited
UNITED STATES PATENTS
| | | | |
|---|---|---|---|
| 3,604,966 | 9/1971 | Liggett | 310/168 |
| 3,487,247 | 12/1969 | Scheffler | 310/168 |
| 3,308,682 | 3/1967 | Puidokas | 74/713 |
| 3,545,568 | 12/1970 | Lacoste | 184/11 A |
| 3,458,741 | 7/1969 | Woodward | 310/168 |
| 3,541,368 | 11/1970 | Jones | 310/168 |
| 3,198,036 | 8/1965 | Muller | 74/713 |

Primary Examiner—R. Skudy
Attorney—Sughrue, Rothwell, Mion, Zinn & Macpeak

[57] ABSTRACT

An angular position or speed sensing assembly has a magnetic sensor head and a toothed tone wheel both supported by one support member adapted to be mounted in an aperture in the axle housing of a vehicle. A ring-shaped extension of the support member protrudes into the axle housing and encircles the axle shaft. A tubular element, also encircling axle shaft, is rotatably carried within the extension and rigidly supports the tone wheel. A claw coupling loosely connects the tubular element to a side gear of the differential gear assembly of the vehicle for rotation therewith. The magnetic sensor head is carried by the support member in a cooperating position with the tone wheel.

3 Claims, 3 Drawing Figures

ROTATION SENSING ASSEMBLY

BACKGROUND AND OBJECTS OF THE INVENTION

This invention relates to a speed or angular position sensing assembly for a driven wheel or axle shaft of a vehicle, particularly for use in anti-skid braking systems. Such a device will hereinafter be referred to as rotation sensing assembly or rotation sensor.

Until now rotation sensors have been usually mounted in strict association with the wheel itself, usually in proximity to the brakes. This gave rise to undue heating, leading to alterations in the electrical characteristics of the rotation sensor, because of the high temperatures which are reached in the vicinity of the brakes in use thereof. This situation could affect the accuracy of the sensor and possibly prejudice its correct operation.

Moreover, the rotation sensors hitherto used required that the indicator should be assembled on its support in situ and connected electrically with external circuits, sometimes under difficult conditions.

Lastly, the usual location of the rotation sensor in an inaccessible location makes maintenance and repair difficult.

A main object of this invention is the provision of a rotation sensing assembly for sensing speed or angular position indicators, particularly for anti-skid braking systems, in which the tendency to overheating of the sensor due to heating of the brakes in use is reduced.

A further object of this invention consists in the provision of a rotation sensing assembly whereby the sensor may be assembled on its support on a bench or in a factory, to facilitate the mounting of the assembly on the vehicle.

Another object of this invention is to provide a rotation sensing assembly which affords easy access to the speed sensor for maintainance and repair work.

It is a further object of the invention to provide a rotation sensing assembly which is easily installed in existing vehicles without great modification.

BRIEF DESCRIPTION OF THE DRAWINGS

A preferred embodiment of the invention will be further described, by way of example, with reference to the accompanying drawings, in which.

DETAILED DESCRIPTION OF THE ILLUSTRATED EMBODIMENT

Figure 1:
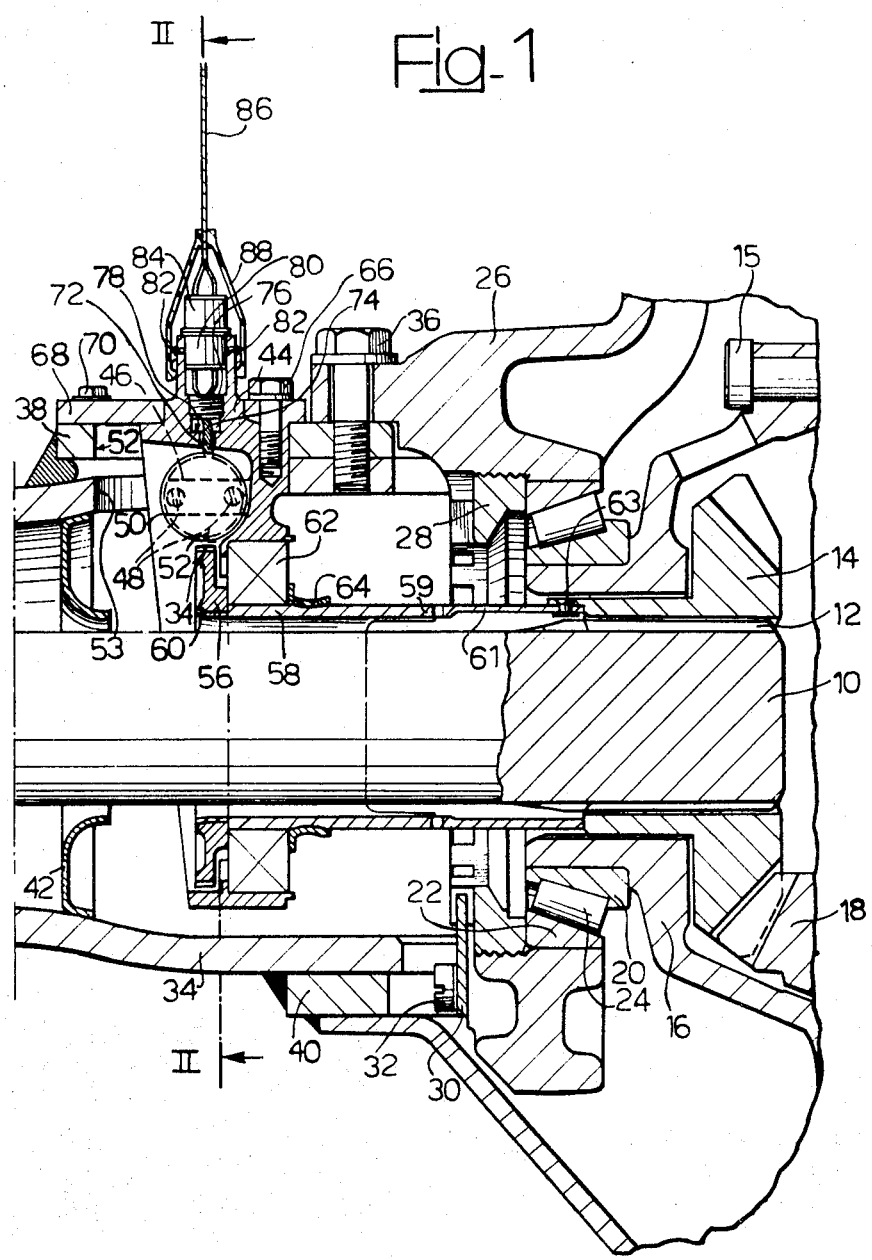
FIG. 1 is an axial section of part of an axle housing of a motor vehicle, showing part of the differential gears, and incorporating a rotation sensing assembly according to the invention.
Figure 2:
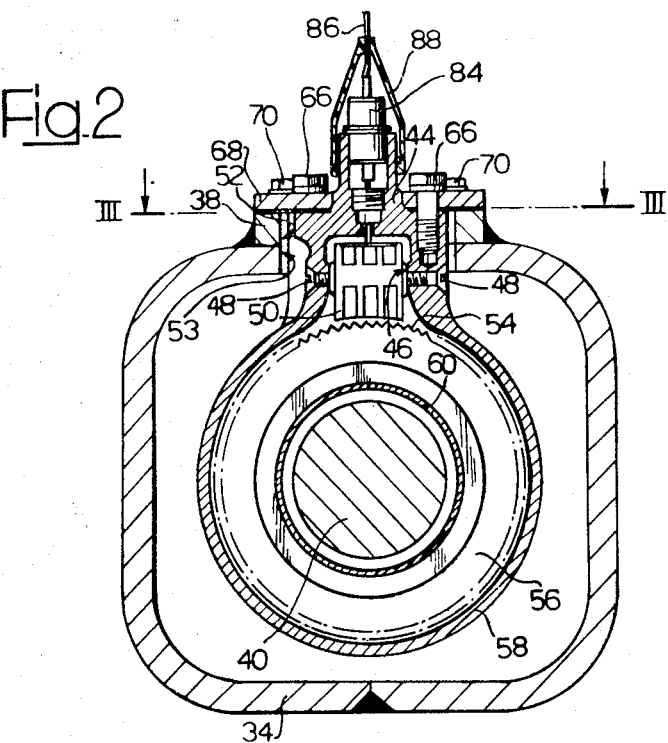
FIG. 2 is a transverse cross-section along line II—II of FIG. 1.
Figure 3:
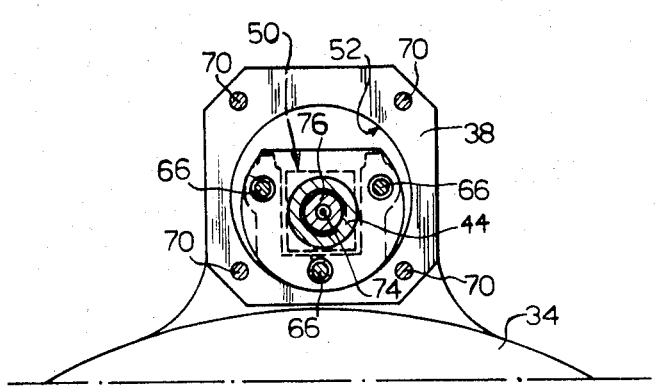
FIG. 3, is a cross-sectional view of a detail of the embodiment along line III—III of FIG. 2.

With reference to the drawings, an axle shaft 10 of a motor vehicle is connected through a splined coupling 12 with a differential side gear 14, enclosed in a cage 16 of the differential gear assembly and meshing with planet gears 18. The cage 16 of the differential gear is mounted rotatably on the differential housing 26 by means of taper roller bearings, one of which is shown in FIG. 1, comprising two rings 20 and 22 and tapered rollers 24. The cage 16 is provided with bolts such as 15 for securing on it a frusto-conical toothed crown wheel (not illustrated) which meshes with a pinion on the transmission shaft (not illustrated) of the vehicle. A metal ring 28 is screwed into a thread opening in the housing 26 to retain the bearing 20, 22, 24, the ring 28 being locked against accidental unscrewing by a small tongue 30, fixed with screws, such as 32, to the differential housing 26 and engaging in a notch in the ring 28.

The differential housing 26 is fixed to the rear axle housing 34 by means of bolts 36 which engage the housings 26 and 34 and which also pass through holes in an annular plate 38 to clamp the latter in position. A reinforcing ring 40 is welded to the bottom of the axle housing 34 and a cover for differential diffrenetial is welded to the ring 40.

An annular baffle plate 42 is welded to the inside of the axle housing 34 and serves to prevent oil splashes entering the axle housing.

Two coaxial circular holes 52 and 53 are provided respectively in the plate 38 and in the upper wall of the axle housing 34 to accommodate an angular speed or position sensing assembly of the type including a tone wheel having ferromagnetic teeth, and cooperating with a magnetic sensor head having pole pieces defining a magnetic gap and adapted to produce changes in an electrical output as a pattern of ferromagnetic material moves past the gap.

The rotation sensing assembly includes a support member 44 having reliefs such as 46 to which a magnetic sensor head 50 is affixed by means of screws 48. A tone wheel 56 having ferromagnetic teeth 54 is mounted on a tubular sleeve 58 which is swaged over at its end 60 to secure the tone wheel 56 thereto and which is rotatable relative to the support 44 by virtue of a bearing 62 located on the sleeve 58 itself by a small swaged collar 64.

The support 44 is secured by means of three screws 66 to a cover plate 68 which is in turn fixed to the plate 38 by four screws 70.

A small output cable 72 leads from the magnetic sensor head 50 through a hole 74 in the support member 44 to a terminal 76 insulated from the support 44 and screwed into a hole which is an extension of the hole 74 of larger diameter than the latter. The cable 72 is connected to a socket element 80, secured in the upper end of the hole 78 by screws 82. A plug 84 is inserted in the socket element 80, and a cable 86 for connection to the external circuit of an anti-skid braking system leads from the plug 84. An insulating cap 88 protects the connector assembly 80, 84.

The terminal 76 is sealed into the respective hole in the support 44 to prevent the escape of oil contained in the axle housing 34.

The sleeve 58 has internal longitudinally extending claws 59 which engage with corresponding claws in a sleeve 61, coaxial with the sleeve 58 and with the axle-shaft 10, the sleeve 61 being fixed by means of small rivets 63 to the respective side gear 14 of the differential.

Another rotation sensing assembly may be mounted in a similar way, but with an arrangement which is a mirror image of that shown in FIG. 1, on the other arm of the rear axle housing, associated with the other driven rear wheel.

Assembly of the system is effected as follows. Before the insertion of the axle shaft 10 in the axle housing 34 the support 44, with the sensor head 50 and tone wheel 56, the bearing 62 and the sleeve 58 mounted thereon, is inserted through the holes 52 and 53, the cover plate 68 being already held in place with screws 66. During the prior assembly of the differential itself the sleeve 61 is riveted to the respective side gear 14. The sleeve 58 is then engaged with the sleeve 61, and the cover plate 68 is fixed to the plate 38 with the screws 70. At this stage the axle-shaft 10 is inserted in position from the outside into the cylindrical space within the sleeve 58 and the sleeve 61, until it engages the side gear 14.

The sensor head 50 can at this stage be readily connected to external circuits by simply inserting the plug 84 in the socket element 80.

The sensor head 50 located in proximity to the rotary part the speed of which is to be measured is subject to the oil temperature in the axle housing, which in operation of the vehicle is usually in the range of 120° – 140°C., This temperature is considerably lower than that in the vicinity of the brakes, where devices of this type were hitherto mounted.

Furthermore the rotation sensing assembly can be mounted on the axle housing of the vehicle as a single unit previously assembled at the bench or in the factory. The motor vehicle itself requires only small modification to permit fitting of the system.

It is a simple matter at any time to dismount the axle shaft 10 by sliding it out through the respective arm of the axle housing, without interfering with the rotation sensor, while dismounting of the rotary parts of the system is effected simply by unscrewing the screw 70 which secures the cover plate 68 to the plate 38 and displacing the rotary parts slightly away from the differential, the holes 52 and 53 being sufficiently large to permit this.

The system according to the invention is such that it can be installed on vehicles already in use without requiring extensive modification thereof.

I claim:

1. A rotation sensing assembly for transducing the rotational movement of an axle shaft enclosed within an axle housing of a vehicle into an electric signal where the driven end of the axle shaft is splined to a differential side gear of the vehicle and the opposite end is drivingly connected to a road wheel of the vehicle, comprising:
   a. a magnetic sensor head having pole pieces defining a magnetic gap and for producing a change in an electric output signal when patterns of ferromagnetic material are moved past the gap;
   b. a support member for the sensor head adapted to be mounted within an aperture in the axle housing so that the magnetic gap of the sensor head is disposed inside the axle housing and having a ring-shaped extension which encircles the axle shaft when the support member is mounted in the aperture;
   c. a tubular element, bearing means rotatably supporting the tubular element on the ring-shaped extension so as to encircle the axle shaft in proper alignment with the magnetic sensor head, coupling means for rotatably driving said element synchronously with the axle shaft through a loose coupling with the side gear;
   d. a tone wheel having a crown of ferromagnetic teeth, said tone wheel being rigidly supported upon said tubular element for rotation therewith, whereby the ferromagnetic teeth move past the magnetic gap during rotation of the tone wheel.

2. The rotation sensing assembly of claim 1, wherein the tone wheel is swaged on an end of the tubular element.

3. The rotation sensing assembly of claim 1, wherein the side gear rigidly carries a sleeve encircling the axle shaft, and said coupling means is a claw coupling between the sleeve and the tubular element.

* * * * *